Oct. 30, 1934.  J. R. OISHEI ET AL  1,978,646

DEVICE FOR MOUNTING ON A SPARE TIRE

Filed Jan. 21, 1929

Inventor
John R. Oishei
by William Paulus
Barton A. Bean Jr
Attorney

Patented Oct. 30, 1934

1,978,646

UNITED STATES PATENT OFFICE 1,978,646

DEVICE FOR MOUNTING ON A SPARE TIRE

John R. Oishei and William Paulus, Buffalo, N. Y., assignors to Trico Products Corporation, Buffalo, N. Y.

Application January 21, 1929, Serial No. 334,094

10 Claims. (Cl. 24—19)

This invention relates to automobile accessories and primarily to rear view mirrors especially designed for being mounted on spare tires which are carried on the running boards or front fenders of motor vehicles at one or both sides of the engine hood.

In the more recent development of the automobile, spare tires have been carried adjacent the engine hood on specially devised brackets or in a well or pocket provided in the forward fender. The spare tire at the side of the engine hood provides an advantageous position for a rear view mirror because the immediate approach of an overtaking vehicle and other emminent traffic conditions to the rear of the machine may be more closely observed. Consequently, this available mount has given rise to the manufacture of spare tire mirrors in which their modes of attachment have been rather impractical and not of an anti-theft character. Heretofore, these spare tire mirrors have been secured in position by leather straps conveniently buckled about the supporting tire and which could easily be unbuckled to permit of the mirror being unauthorizedly removed from its mount.

The present invention has for its objects to provide an anti-theft mirror with lock controlled means for securing the mirror on the spare tire; to provide a strap or other flexible member for passing about the inner periphery of the tire with means for securing the ends of the strap or anchoring member to the mirror standard against unauthorized displacement; and to provide means on the mirror standard whereby any slack in the anchoring member may be readily taken up so as to firmly secure the mirror in its proper position.

The invention further resides in the structural formation and assembly of the standard parts, and also in the features, arrangements and combinations of parts hereinafter described more fully, reference being had to the accompanying drawing wherein, Fig. 1 is an elevation, partly in section, of the improved mirror mounted on a spare tire, the latter being shown by broken lines.

Figure 1:
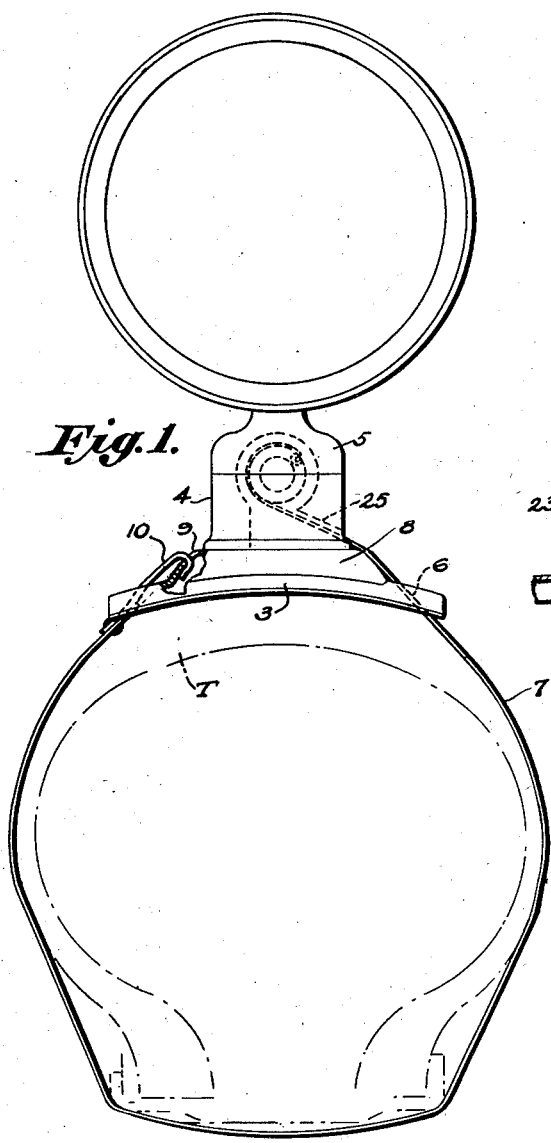
Figure 2:
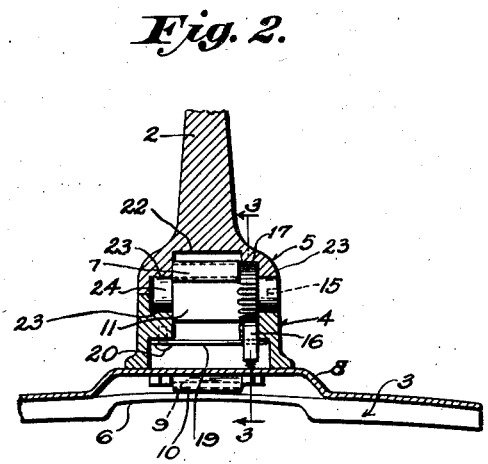
Fig. 2 is a detailed sectional view showing the windlass mounted with the standard.
Figure 3:
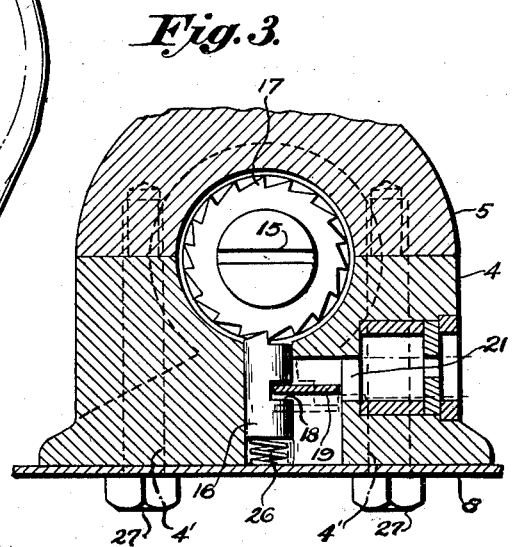
Fig. 3 is a transverse sectional view taken about on line 3—3 of Fig. 2.
Figure 4:
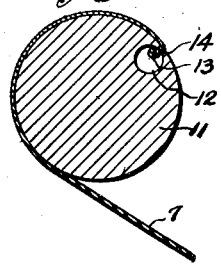
Fig. 4 is a detailed view of the windlass.

Referring more in detail to the accompanying drawing, the numeral 1 designates the reflector body of the rear view mirror which is supported on a standard 2 herein depicted in its preferred embodiment as consisting of a multi-part base having a stamped or formed sheet-metal bottom section 3 surmounted by a heavier, intermediate cast section 4 and a like molded top section 5. The bottom section 3, which obviously could be molded, is preferably shaped to more or less conformably seat on the periphery of the tire, indicated at T, and is of greater expanse than the intermediate section 4 so as to afford a broad supporting base to hold the mirror against undesirable vibration. The bottom section is cut away at its opposite sides, as indicated at 6, to receive the anchoring member 7, and is further provided with a central platform 8 on which the intermediate section 4 finds support. One side wall of this platform is provided with an opening 9 in which is detachably engaged a hook 10 on the free end of the flexible anchoring member.

This anchoring member is herein depicted in the form of a metal strap which may be of a relatively hard metal to thwart unauthorized removal of the mirror by severing the strap. The opposite end of the anchoring member 7 is fixedly secured to a windlass 11, the preferred mode of attachment being to provide a socket 12 in the barrel of the windlass adjacent its periphery and substantially parallel to its axis and then inserting the rolled terminal 13 of the anchoring member 7, the portion of the strap adjacent the roll passing into the slot 14 through which the socket opens at the periphery of the drum. One end of the drum is provided with a key-receiving slot 15 in which a tool may be engaged for winding the drum so as to tighten the anchoring member 7 about the tire after said anchoring member has first been passed thereabout and the hooked end engaged in the opening 9. The drum is held against unwinding by a spring pressed pawl 16 engaging with its ratchet teeth 17 and slidably disposed in a guide in the intermediate section 4. This pawl is provided with a notch 18 in which engages one end portion of a leaf spring 19 to support the same in its guide, the opposite end of the leaf being fixed at 20 to the intermediate base section 4. The leaf spring 19 extends adjacent a key-opening 21 in said intermediate section, through which a key may be inserted and turned to exert a downward camming action on the leaf and therethrough effect a downward retraction of the pawl 16 from the ratchet teeth 17 to permit unwinding of the drum with a consequential slackening on the anchoring member 7.

The meeting faces of the intermediate section 4 and the top section 5 are cored or hollowed out to form a housing 22, for the drum or barrel, and component bearings 23 for the journals 24 of the drum. The intermediate section is provided in its lower side with a gateway or entrance opening 25 leading to the housing 22 through which the flexible anchoring member moves as it is wound on or unwound from the windlass. The pawl or dog 16 may be backed by a coil spring 26 for urging the same into operative engagement with the teeth 17, and the leaf spring 19 may be utilized solely as a link or power member to transmit the key-imparted movement to the pawl. The several sections of the base may be secured together by screw bolts 27 which are passed upwardly from the under side of the bottom section 3, through holes 4' in the intermediate section 4, and engaged in threaded sockets in the upper section 5. This method of assembly conceals the heads of the assembly screw bolts 27 against being tampered with, said bottom section preferably having a depending marginal flange to more or less inclose the bolt heads.

In use, the mirror is placed upon the tire and the hooked end 10 of the anchoring member is passed across the inner periphery of the tire, between the spokes of the spare wheel, (not shown), brought up on the opposite side of the tire and engaged in the opening 9. A tool applied to the slot 15 is then turned to revolve the barrel or drum and cause the strap to be wound thereon with the resultant tightening of the strap about the tire. This tightening also draws the hook 10 firmly into engagement with the wall of the opening 9 and thereby secures it against displacement. To remove the mirror the key is inserted in the key-opening 21 and turned to depress the pawl and its connected pawl whereupon the anchoring member may be slackened and the hook 10 disengaged.

What is claimed is:

1. A device for mounting upon a spare tire comprising a hollow body having a base for seating upon the tire, a windlass barrel housed and journalled within the said hollow body, said body having an opening therein, a flexible anchoring member having one end passing through said opening and secured to said barrel, cooperating means on the opposite end of said flexible anchoring member and on said base for detachably securing to the base the opposite end of the anchoring member after passing it about the tire, and means for controlling the winding and unwinding movements of the windlass barrel.

2. A device for mounting upon spare tires, comprising a supporting standard provided with a housing, a windlass in said housing, a flexible anchoring member having one end secured to said windlass against unauthorized displacement and its opposite end detachably engageable with the base, means whereby the windlass may be rotated to wind the anchoring member thereabout, a pawl and ratchet mechanism within the standard for releasably holding the windlass against unwinding movement, and a key-controlled member for rendering the pawl of said mechanism inoperative.

3. In a device of the class described, a supporting standard having a base, a windlass journalled on said standard, a flexible anchoring member having one end secured to said windlass against unauthorized displacement and its opposite end detachably engageable with the standard after being first passed about a mounting support, ratchet teeth formed on said windlass, a pawl engaging the ratchet teeth to hold the windlass against unwinding movement, a leaf member fixed at one end on the base and engaged at its opposite end with said pawl for moving the same, said base being provided with a key opening adjacent said leaf member to receive a key for moving said leaf member to effect withdrawal of the pawl from engagement with ratchet teeth.

4. In a device for mounting on a spare tire, a hollow supporting standard, adjustable take-up means within and housed by said standard, a flexible anchoring member for engaging about the tire and having one end connected within said standard to said take-up means, and means on the opposite end of said flexible member for detachably engaging said opposite end with a part of the assembly.

5. In a device for mounting on a spare tire, a hollow supporting standard, adjustable take-up means within and housed by said standard, an anchoring member for engaging about the tire and having one end connected within said standard to said take-up means, and a hook part carried by the free end of the flexible member for engagement with the standard, said hooked engagement being maintained operative by and upon taking up the slack in said flexible member about the tire by adjusting said first end of the flexible member.

6. A device for mounting upon spare tires comprising a tire-engaging base section, a standard surmounting the base section and detachably connected thereto, said detachable connection being accessible from the under side of said base section and being concealed when the device is operatively installed, and lock-controlled means carried by the standard for detachably securing the device to the spare tire in a manner to render the detachable securing means inaccessible.

7. In a device for mounting upon a spare tire, a hollow standard having a base for engaging such tire, an anchoring member engaged at one end with the standard and passable about a spare tire, and lock-controlled means within the standard and engaging the opposite end of said anchoring member for taking up slack in said anchoring member.

8. An accessory for spare tires, comprising a hollow standard, a flexible anchoring member for passing about the mounting tire, means detachably connecting one end of said anchoring member to the standard, said means comprising an engaging part and a hook part, the latter detachable from said engaging part when the anchoring member is slack and interlockable with the engaging part against disengagement when the anchoring member is taut, and take-up means carried by and within the standard and fixed to the opposite end of said anchoring member for drawing the latter taut about the mounting tire.

9. A device attachable to spare tires, including a support having an opening at one side and a housing opening toward the opposite side, a flexible anchoring member having a hook on one end for hooking into the opening and having its opposite end extending into the housing through the housing opening, and means connected to the opposite end of the anchoring member within the housing for drawing the anchoring member taut about the mounting tire after first engaging the hook end.

10. In a device of the class described, a standard having a hollow housing portion, rotatable means housed within said housing portion, a flexible anchoring member having one end secured to said rotatable means whereby upon rotation of the latter in one direction, the effective length of the anchoring member will be lessened, means within said housing for normally holding said rotatable means against rotation in the opposite direction, and key controlled means within said housing for releasing the holding means.

JOHN R. OISHEI.
WILLIAM PAULUS.